Aug. 7, 1962 F. C. KOCH ET AL 3,048,438
TRAILER CONSTRUCTION
Filed Oct. 28, 1960 4 Sheets-Sheet 1
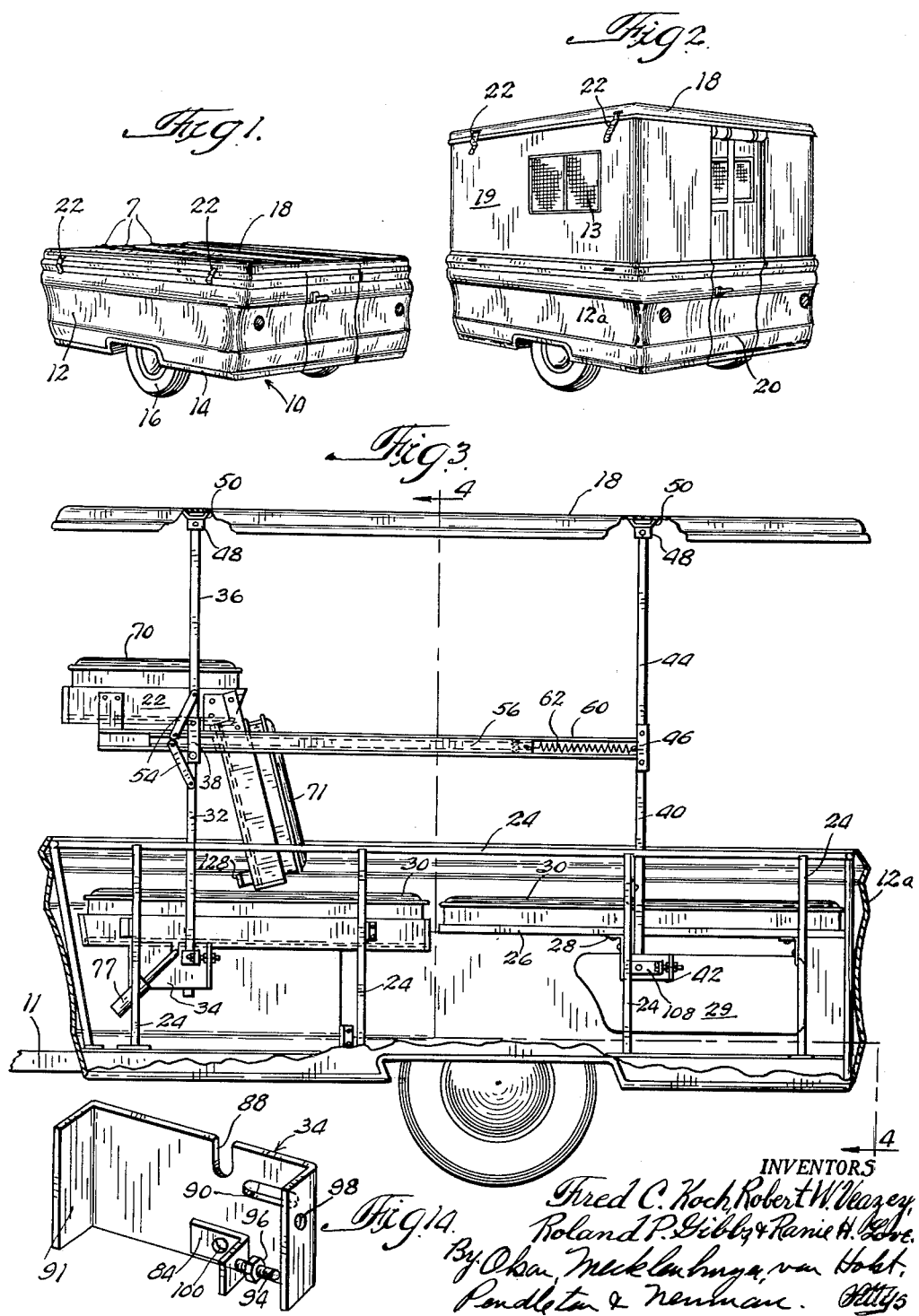

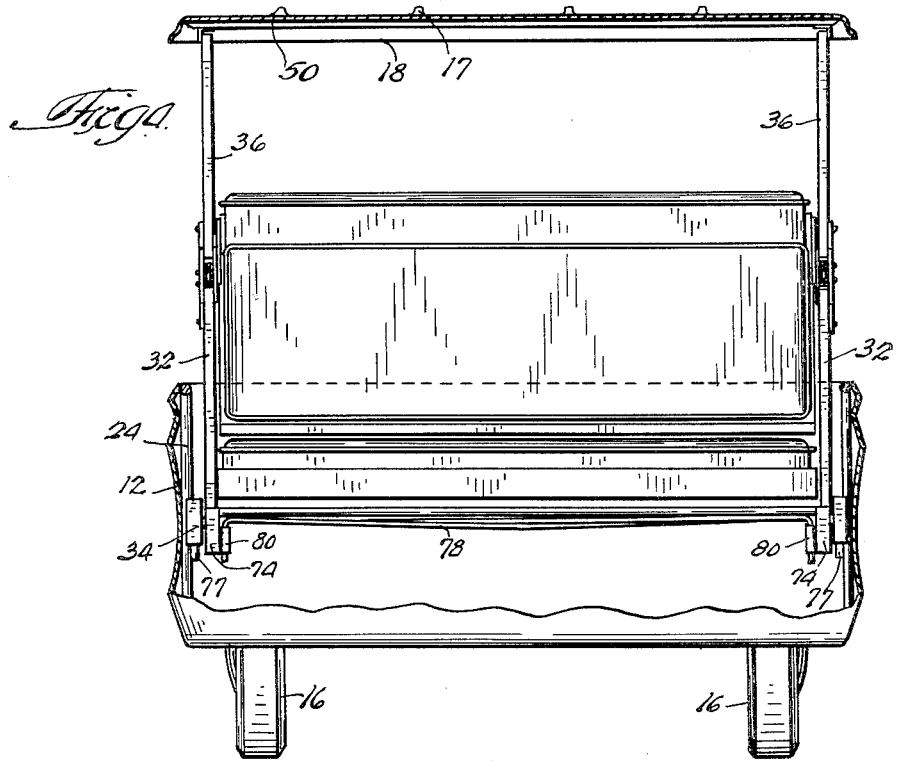
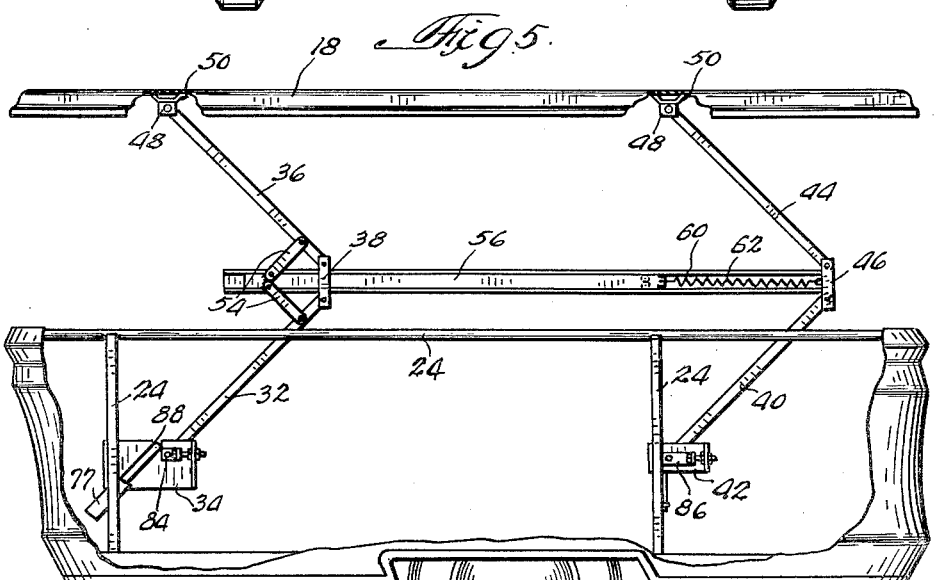
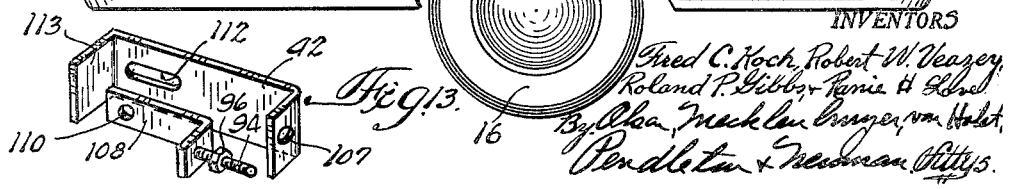

Aug. 7, 1962
F. C. KOCH ET AL
3,048,438
TRAILER CONSTRUCTION
Filed Oct. 28, 1960
4 Sheets-Sheet 3
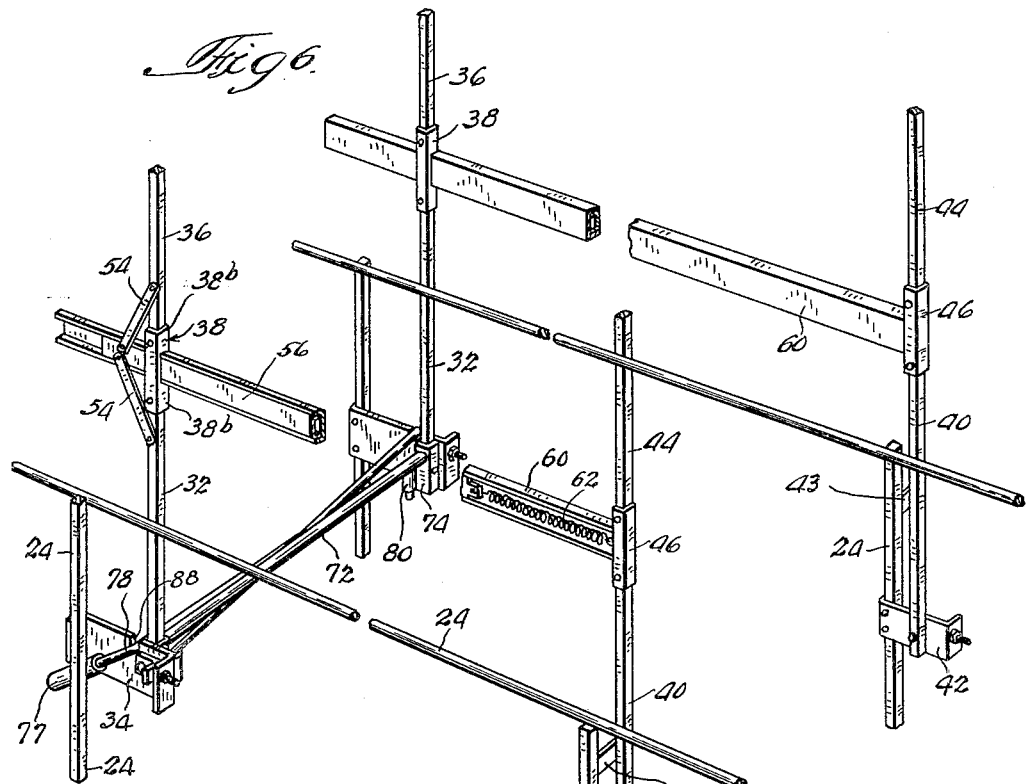
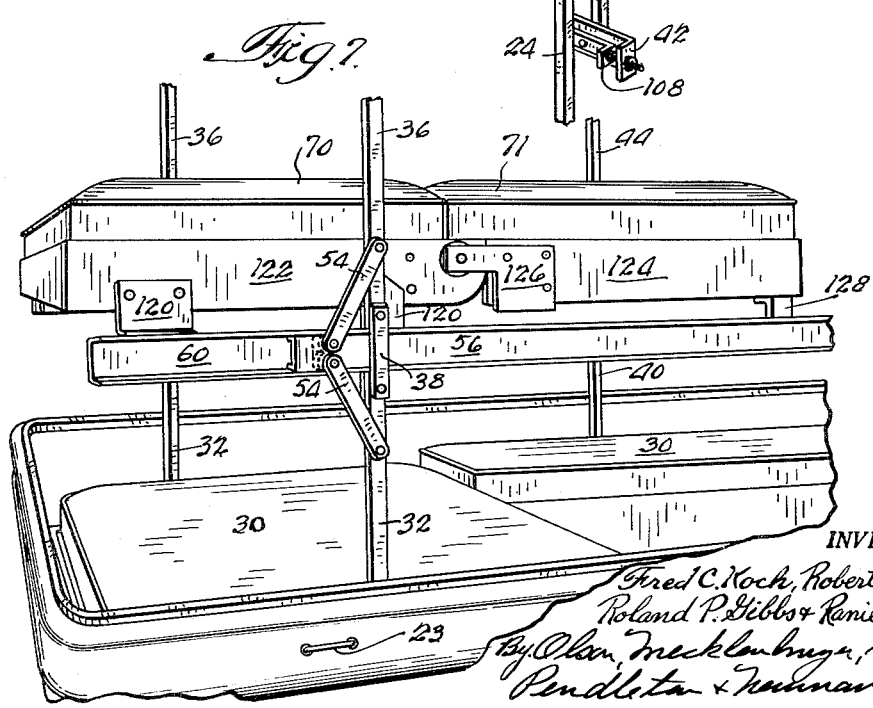

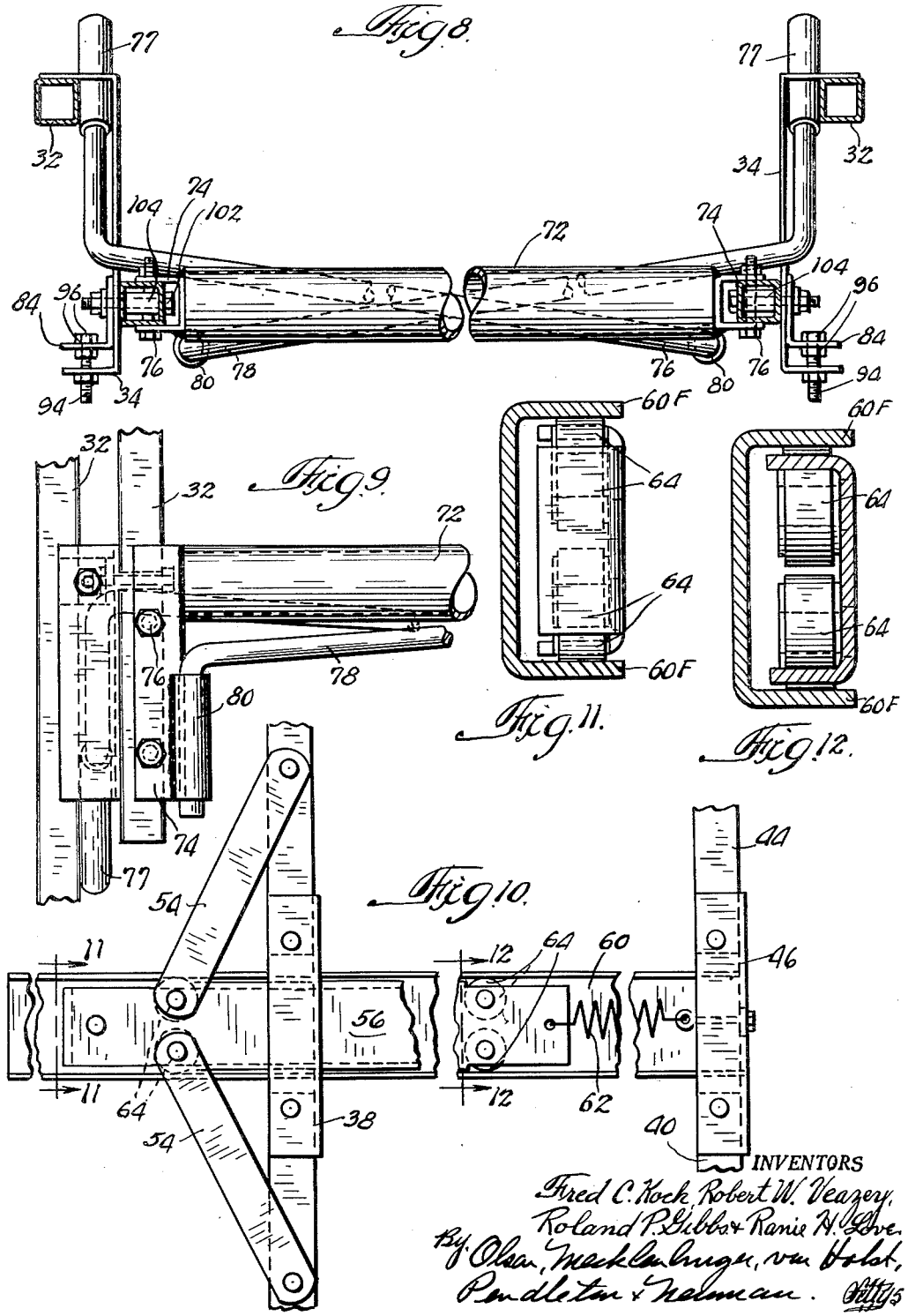

United States Patent Office 3,048,438
Patented Aug. 7, 1962

3,048,438
TRAILER CONSTRUCTION
Fred C. Koch, Robert W. Veazey, Roland P. Gibbs, and Ranie H. Love, Wichita, Kans., assignors to Koch Engineering Company, Inc., Wichita, Kans., a corporation of Kansas
Filed Oct. 28, 1960, Ser. No. 65,675
12 Claims. (Cl. 296—27)

This invention relates to a novel camping trailer construction and more particularly relates to a collapsible trailer construction which may be elevated into the operating position in a matter of seconds.

Camping outdoors has long been recognized as one of the most satisfying and beneficial pastimes afforded to the people of the United States. The availability of great open expanses of virgin land possessing natural beauty still untouched by the hand of man renders the United States the envy of many countries of the world. Increasing numbers of persons are becoming aware of the satisfaction which camping affords. Various equipment has been made available in the past to render camping outdoors both feasible and enjoyable. Heretofore one of the major drawbacks of outdoor camping comprised the time-consuming labor which of necessity had to be expended in the erection and collapsing of temporary movable shelter.

It is an object of this invention to provide a trailer particularly adapted for camping purposes which may be opened or collapsed in a matter of seconds by means of novel torsion bar and spring assemblies, which will hereinafter be explained in greater detail.

It is another object of this invention to provide a novel trailer construction which is light-weight and so sturdily designed that it may be transported by automobiles of any size over even the roughest roads and paths.

It is a further object of this invention to provide a novel camping trailer construction which, in the erected position, may comfortably house a number of adults, while in the collapsed condition possesses a low center of gravity which enables the same to be moved over roads with speed and safety.

The above and other objects of this invention will become more apparent from a reading of the following detailed description, when read in the light of the drawing and appended claims.

In one embodiment of this invention, a trailer having a reciprocally movable overlying roof is provided. The trailer also has a peripheral solid half-wall which may be of fiber glass-reinforced plastic or the like, mounted on a supporting skeleton of metal bars, rods or the like which, in turn, is mounted on a vehicle base. The overlying roof lies on top of the solid wall when the trailer is in a collapsed condition for transport or in periods of non-use, and extends over the trailer body at a height approximately twice that of the wall when in the erected position of use. The roof is reciprocally moved into open or closed position by a collapsible support or framework composed of a plurality of lifting arms which is, in turn, actuated by a novel torsion bar assembly.

The lifting arms are of equal length and arranged in pairs consisting of an upper arm and lower arm which are pivotally connected to an interposed clevis member. Two pairs of lifting arms are disposed in spaced relationship along each side of the trailer. A horizontally disposed track and slide assembly engages the two clevis members of the two pairs of lifting arms disposed along each side of the trailer. The track and slide assemblies assist in the uniform collapse of the lifting arm pairs whereby the four upper lifting arms uniformly pivotally move in a predetermined direction toward the trailer front or rear and the four lower lifting arms pivotally move in the opposite direction as will hereinafter be explained in greater detail. The lifting arms of each trailer define double parallelogram configurations having a common side, as the roof is raised and collapsed in the normal course of trailer use. When the trailer roof is in the fully raised position all arms are in a vertical position.

A novel torsion bar assembly consisting of two torsion bars comprises the means for lifting the roof. Each bar spans the interval between the front lower lifting arms and is fixedly anchored at one end limit and secured at an opposed end limit to the oppositely disposed lower, pivotally movable lifting arm. When the lower lifting arms pivot to collapse the lifting-arm framework and lower the trailer roof, the torsion bars are twisted from their normal configuration and have stored therein twisting forces tending to return the bars and the lifting-arm assembly to their original positions. The weight supported by the lower lifting arms is thus utilized to twist the torsion bars into distorted positions. When the lifting-arm assembly is raised the twisting forces, or torque, in the torsion bars are released rendering raising of the trailer roof a simple operation requiring no expenditure of effort on the part of the person releasing the trailer roof from its locked, lower position.

For a more complete understanding of this invention, reference should now be made to the drawing, wherein:

FIGURE 1 is a perspective view of one embodiment of the trailer construction of this invention with the roof thereof illustrated in the lowered position;

FIG. 2 is a view similar to FIG. 1 illustrating the trailer roof in the elevated position;

FIG. 3 is a fragmentary side elevational view partially broken away of the trailer construction of FIG. 2, with the canvas wall portion of FIG. 2 omitted;

FIG. 4 is a sectional view partially broken away taken on line 4—4 of FIG. 3.

FIG. 5 is a side elevational view of the elevating and lowering mechanism of the provided trailer construction, the lower trailer wall portion being broken away and certain supporting structure being omitted so that the roof lifting and lowering mechanism may be clearly seen;

FIG. 6 is a fragmentary perspective veiw of the roof elevating and lowering mechanism of the provided trailer construction;

FIG. 7 is a fragmentary perspective view of the provided trailer construction, illustrating bunk members which may be employed in the trailer interior;

FIG. 8 is an enlarged fragmentary top plan view partly in section illustrating the torsion bar assembly of the provided trailer construction;

FIG. 9 is a fragmentary elevational view of one end portion of the torsion bar assembly illustrated in FIG. 8;

FIG. 10 is an enlarged fragmentary side elevational view illustrating a slide and track assembly together with linking arms employed for assuring coaction between the upper and lower lifting arms of the provided trailer construction;

FIG. 11 is a sectional view taken on line 11—11 of FIG. 10 and illustrated on an enlarged scale;

FIG. 12 is a sectional view taken on line 12—12 of FIG. 10 and illustrated on an enlarged scale;

FIG. 13 is a perspective view of a pivot plate and adjusting plate employed with the rear lifting arms in the illustrated trailer construction; and FIG. 14 is a perspective view of a pivot plate and adjusting plate which engages the torsion bar assembly of the provided trailer construction and which are employed with the front lifting arms of the illustrated trailer.

For a more complete understanding of this invention, reference will now be made to FIG. 1, wherein a camping trailer construction 10 is illustrated, comprising a peripheral wall portion 12 which is mounted on a vehicle base 14. The entire trailer 10 is supported on wheels 16. A conventional yoke such as yoke 11 fragmentarily illustrated in FIG. 3 enables the trailer 10 to be attached to the rear of an auto (not illustrated).

In FIG. 2, the trailer 10 is illustrated with a roof member 18 in the elevated position. In the normal course of use a canvas wall 19 having windows 13 formed therein will depend from an edge portion of the roof 18 and be connected to the underlying upper edge of the trailer wall 12. A door 20 allows entry and exit into and out of the trailer interior. When the trailer roof 18 is in its lowermost position of FIG. 1, strap means 22 which engage handles 23 more clearly seen in FIG. 7, or equivalent securing means are employed for locking the roof to the underlying supporting body portion 12. The collapsed trailer position shown in FIG. 1 is that position in which the trailer is transported by means of an automobile, whereas the erected position of FIG. 2 is the normal position of use.

The lower trailer wall 12 may be formed of a light-weight plastic reinforced with fiber glass which is mounted on a supporting framework, such as a metal skeleton of rods 24 or other equivalent means, most clearly seen in FIG. 3. In this latter figure one side of the trailer wall 12 is broken away so that the trailer interior may be more clearly seen. Although the trailer wall 12 is preferably formed of a light-weight material which also possesses strength, the fiber glass reinforced plastic is given by way of illustration only and a trailer wall formed of aluminum or light-weight metal or wood would also function to advantage for purposes of this invention.

As will also be noted from FIG. 3, the framework members 24, which are illustrated in the vertical position, may support shelf members or ledges 26 by means of brackets 28. The members 26 may, in turn, support illustrated bunk members 30.

The means for effecting reciprocal movement of the trailer roof 18 comprises the lifting arm and torsion bar assembly, most clearly seen in FIGS. 5 and 6. The torsion bar assembly alone is clearly shown in FIG. 6, as well as FIG. 8.

Referring now more particularly to FIG. 5, a view similar to FIG. 3 is illustrated, in which the bunk members and a portion of the supporting framework of the trailer have been eliminated. In FIG. 3 the roof 18 is illustrated in the process of being collapsed. In FIG. 5 a front lower lifting arm 32 is illustrated which is pivotally mounted to a front pivot plate 34, which in turn, is fixedly secured by welding or the like to a vertical frame member 24.

Overlying the lower front lifting arm 32 is a front upper lifting arm 36 which is connected to the lower lifting arm 32 by means of interposed clevis member 38. It will also be seen in FIG. 5 that a rear lower lifting arm 40 is pivotally mounted on a rear pivot plate 42 which is in turn secured to a vertical frame member 24 by welding or the like. The rear lower lifting arm 40 is connected to a rear upper lifting arm 44 by means of an interposed clevis 46. It should be appreciated that FIG. 5 illustrates only four of a total of eight lifting arms inasmuch as FIG. 5 represents a side view. As will be seen from FIG. 6 each pair of upper and lower lifting arms has a twin pair of lifting arms disposed on the opposite side of the provided trailer construction.

The roof 18 of the trailer engages, by means of brackets 48, distal end limits of the upper front and rear lifting arms 36 and 44 respectively. It will be seen from FIG. 5 that brackets 48 are mounted on transverse channels 50 which are fixedly secured to the undersurface of the illustrated roof 18. It will be noted from FIG. 5, as well as FIG. 3, that each of the lifting arms is substantially identical in structure to all others. It is apparent, therefore, that if the lifting arms are uniformly pivoted at their junctures with the clevis members 38 and 46, the roof 18 will lower in a horizontal plane in the manner illustrated in FIG. 5.

To assist in the uniform collapse of the front and rear lifting arms of the construction of FIG. 5, linking arms 54 are employed which are pivotally engaged at one end limit to and end portion of each front linking arm disposed adjacent its pivotal connection with clevis member 38. Each linking arm is pivotally mounted at its second end limit on a slide member 56 having a substantially C-shaped cross-sectional configuration, illustrated in FIGS. 3 and 5 and, also, clearly seen in FIGS. 7 and 10.

It is apparent from FIG. 5 that as the lower lifting arms 32 and 40 are pivoted to the right or toward the trailer rear, the linking arm 54, pivotally mounted on lower lifting arm 32, will move to the left, forcing linking arm 54 of the front upper lifting arm 36 to move to the left because of the attachment of the two linking arms to the slide member 56. The slide 56 longitudinally moves in a horizontal plane relative to a track 60 also having a C-shaped cross-sectional configuration of larger dimensions in which disposed. The back to back arrangement of the slide 56 in the track 60 is apparent from FIGS. 11 and 12. Each track 60 has fixedly secured thereto the two clevis members 38 and 46 by welding or the like. The end portion of track 60 in engaging clevis 46 may be welded, bolted or similarly secured to either of the twin wall portions of clevis 46. The portion of the track 60, illustrated traversing clevis 38 (see FIG. 6), may be welded to peripheral portions of the clevis defining the opening through which the track 60 and slide 56 pass. The interval between the two clevis members remains fixed at all times and comprises the normal interval between the lifting arm connected pairs when the roof 18 of the trailer is in the upper position, such as is illustrated in FIGS. 2 and 3. The linking arms 54, therefore, are seen to comprise means which assure the uniform reverse pivotal movement of the lower lifting arms 32 and upper lifting arms 36.

It will be noted from FIG. 5 that a tension spring 62 is attached at one end limit to clevis member 46 and at the other end limit to one end of slide 56. When the roof 18 is being lowered, track 60 is pulled to the right or trailer rear by the person lowering the trailer roof, as illustrated in FIG. 5, resulting in reverse pivotal movements of the lower lifting arms 32 and upper lifting arms 36, effected by means of the linking arms 54. As the linking arm portions mounted on slide 56 collapse to the left or trailer front as illustrated in FIG. 5, the slide 56 also moves to the left relative to the track 60, stretching the tension spring 62. Tension spring 62, therefore, creates available forces for returning the linking arms 54 to their position assumed when the roof is in the raised position, such as is illustrated in FIG. 3. When the roof 18 is raised by the lifting arms, the arms 54 function in the manner of toggle bars with the released forces of tension spring 62 utilized.

It will be noted from FIGS. 11 and 12 that the opposed end limits of slide 56 have wheels 64 mounted thereon for the purpose of rotatably engaging upper and lower flange portions 60f of the track member 60 in which received. It will be more clearly seen from FIG. 6 that the slide 56 is permanently retained within the channel-like track 60 not only by means of the linking arms 54 but also by means of the lateral unapertured sides of clevis 38 which function as a locking means. In the normal course of operation, therefore, when it is desired to raise or lower the roof 18 of the trailer, the track 60 or a bunk member such as bunk members 70, which may be supported thereon, as illustrated in FIG. 7, may be pulled to the right (as illustrated in FIG. 5), or toward the rear of the trailer. Such initial movement forces the upper and lower supporting arms to collapse as walls of a double parallelogram having the track and slide assemblies as common sides and the trailer roof and floor defining the upper and lower portions. As the lifting arms collapse, the slide 56 stretches spring 62 which has a tendency to pull the slide 56 back to the right. This is the direction in which it moves when the roof is moved to the elevated position of FIG. 3.

When the roof is returned to the elevated position by pivotal actuation of the lower lifting arms 32 and 40, the bight portions 38b of clevis 38 and more clearly seen in FIG. 6 function as stop surfaces preventing further movement of the slide 56 relative to track 60 and also function to position the upper lifting arm 36 in a vertical plane. Bight portion 46b of clevis 46 similarly functions to stop the pivotal movement of lifting arm 44 assuring disposition in a vertical plane. Sufficient tension is always in spring 62 whereby slide 56 is always urged toward clevis 46.

The foregoing discussion was concerned with the lifting arms and associated members which assure the uniform collapse and erection of the roof member 18, so that the same may raise and lower in a horizontal plane. However, in accordance with this invention, means are also provided so that the series of eight lifting arms may be raised or collapsed into the roof-elevating or roof-collapsing position with a minimum expenditure of effort. The main means for raising the lifting arms, supported roof and supported bunk members, such as bunks 70 illustrated in FIG. 7, comprises a novel torsion bar assembly more clearly seen in FIGS. 6 and 8.

It will be noted from FIG. 6 that a heavy bar or rod 72 extends between the opposed front lower lifting arms 32. The rod 72 is secured at opposed end limits to clevis members 74 which are bolted or otherwise suitably affixed to lower end portions of the lower lifting arms 32. Securing bolt members 76 affixing the clevis members 74 to the lower lifting arms 32 are more clearly seen in FIGS. 8 and 9. The stabilizer bar 72 assures the simultaneous raising and lowering of the opposed lifting arms 32. Accordingly, the structure supporting one side of the roof 18 will not have a tendency to move in a manner other than simultaneously with the structure supporting the other side of the roof 18 because of the rigid interconnecting stabilizer bar. Constantly urged against each pivot plate 34 is a tubular housing member 77 which serves to anchor one end of a torsion bar 78. The bar is supported by the plate 34 in a notch 88. Bar 78 is constantly in a distorted twisted condition which varies in accordance with the roof position. The opposite and freely movable end of the torsion bar 78 is inserted in a stabilizer bar tubular portion 80. The tube 80 is welded, or otherwise fixedly secured, to the clevis member 74 which engages the stabilizer bar 72 and which is thus movable with the lower lifting arms 32. Each stabilizer bar tube 80 which pivotally moves when a lifting arm 32 pivots, receives the free end of the torsion bar 78 oppositely disposed to the end mounted in the anchor 77.

Accordingly, when the lifting arms 32 as seen in FIG. 6 are pivotally moved to the right to enable the roof 18 to collapse, the two torsion bars are twisted into a distorted configuration and, because of the resilient properties of the material of construction of each torsion bar 78, each free end of the torsion bar housed in the stabilizer bar housing 80 has a tendency to revert to its original untwisted condition. Therefore, when the lower lifting arms pivotally move to the right, the upper lifting arms pivotally move to the left and the roof descends in a single vertical plane. During this movement the weight supported by the lower lifting arms 32 assists in twisting the two torsion bars so that no great effort need be expended in the lowering of the roof. In the lowered position the torsion bars will raise the lifting arm-roof assembly unless a locking means is employed for restraining the torsion bars from returning the roof and supporting framework to the elevated position. Straps 22 of FIGS. 1 and 2 comprise such a means. The torsion bar positions and sizes should be such that they have more than sufficient torque in the twisted condition when the roof is lowered to return the same to the elevated position whereby the lifting arms are constantly urged into the roof-elevating position.

Thus, when it is desired to raise the roof from the position of FIG. 1 to the position of FIGS. 2 and 3, all that need be done is to release the roof from its locked position atop trailer wall 12 enabling the twisting forces in the torsion bars tending to return the torsion bars to their original untwisted condition to come into play. Thus, it is seen that when the roof is lowered, the structure supported by the lifting arms assists in twisting the torsion bars. In raising the roof 18, the twisting force or torque stored in the torsion bars is released, overcoming the weight supported by the lower lifting arms 32 and returning the roof 18 and other supported structure to the elevated position. It is most clearly seen from FIG. 4 that the two torsion bars are twisted and cross each other in the central portions thereof in the normal assembled position.

The opposed pairs of front lifting arms and rear lifting arms should be in transverse alignment to assure uniform raising and lowering of the arms as a unit. To assure substantially exact transverse alignment, adjusting plates 84 are used in conjunction with pivot plates 34 and adjusting plates 108 are used in conjunction with pivot plates 42.

As will be most clearly seen from FIG. 14, each pivot plate 34 possesses the notch 88 for reception of a torsion bar 78 and also an elongate slot 90 for purposes of exactly centering the lower lifting arm 32 which is pivotally mounted on the pivot plate 34. As will be most clearly seen from FIG. 8, each adjusting plate 84 may be positioned as desired relative to the elongate slot 90 of pivot plate 34 by means such as the illustrated bolt member 94 and nut members 96. The latter members anchor the adjusting plate 84 relative to aperture 98 of the pivot plate, as well as elongate slot 90. Flange portion 91 of pivot plate 34 facilitates securing of the same to a supporting trailer frame member.

It will be seen from FIG. 14 that each adjusting plate 84 has an aperture 100 disposed in one arm portion thereof. Aperture 100 serves as a mounting aperture for a bolt member, such as bolt 102 of FIG. 8, on which a bushing 104 may be disposed and on which the lifting arms 32 may in turn pivot. In view of the adjustability allowed between the opposed lifting arms 32, it is an easy matter to pivotally mount the same so that they are in transverse alignment.

The lower rear lifting arms 40 may be transversely aligned by means of similar adjusting plates 108, which are of substantially the same construction as adjusting plates 84. Plates 108 have apertures 110 disposed therein. Aperture 110 may be readily disposed, as desired, relative to elongate slot 112 of the rear pivot plate 42. After proper disposition of the adjusting plate aperture 110, a bolt having a bushing disposed thereover may be readily locked to the adjusting plate 108, enabling the lower rear lifting arms 40 to be pivotally movable about such bushing (not illustrated), disposed within a transverse aperture of the rear lifting arm 40. Aperture 107 in pivot plate 42 enables adjusting plate 108 to be secured thereto by means of the nuts and bolts 96 and 94. Flange 113 of pivot plate 42 facilitates securing of the same to a supporting framework member.

Inasmuch as the tracks 60 of the illustrated lifting and lowering mechanism are always disposed in a horizontal plane, bunk members such as bunk 70 shown in FIG. 7, may be supported thereon by means of brackets 120 and the bunk will always remain in the horizontal plane regardless of the roof position. The upper bunk 70 may be fixedly mounted on the tracks 60 by means of framework 122, and the adjacent bunk 71 mounted in framework 124 may be hingedly mounted by means of hinge 126 to framework 122 and may pivot downwardly into the position illustrated in FIG. 3 when it is desired to use bunk 71 as a back-rest for a lower bunk 30, as illustrated in FIG. 3. To enable such pivotal action to take place, bracket 128 mounted on bunk framework 124 must also be pivotally movable into and out of engagement with the supporting track member 60.

It is seen, therefore, that a novel trailer construction has been provided which enables the roof thereof to be elevated in a matter of seconds above a lower trailer body portion by means of a novel torsion bar assembly. The various lifting arms which support the overlying roof 18 of the provided trailer are forced to retain a double parallelogram configuration by means of linking arms 54 and a novel track-and-slide assembly previously discussed.

Inasmuch as the upper and lower lifting arms in the proposed trailer construction move simultaneously through substantially identical angles relative to their respective pivot axes, but in reverse directions, and since the arms are of uniform effective length, the roof 18 must, of necessity, move in the course of raising and lowering, in a single vertical plane and will always come to rest on top of the lower trailer body edge in the manner illustrated in FIG. 1. Similarly, in the raised position, the roof will be disposed directly over the edge of the lowered trailer body in the manner illustrated in FIGS. 2 and 3. Since the torsion bars 78 are always in a twisted condition regardless of the roof position they always have a tendency to move the lifting arms into the elevated position. The use of stop members 43 secured to framework members 24 clearly seen in FIG. 6 insure the disposition of the rear lifting arms 40 and, therefore, all of the lifting arms in the vertical plane.

As previously mentioned, the tension in the spring 62 will facilitate movement of the upper and lower arms simultaneously to a vertical position and the previously described torsion bar system enables raising and lowering of the entire roof and lifting-arm assembly to be effected with a minimum expenditure of effort.

It is apparent that many modifications may be made in the illustrated structure which will not depart from the scope of this invention. It will be noted, for instance, and it may be seen from FIG. 1, that ribs 7 may be formed in the roof to impart strength and rigidity thereto and prevent warping thereof. It is apparent that a door, such as the door 29 illustrated in FIG. 3, may be employed in the lower trailer body portion so that the space beneath the bunks within the trailer may be used for storage purposes. The provided trailer construction, although simple in design, may be moved into operational or non-operational position in a matter of seconds. Because of the low center of gravity in the position of FIG. 1, the trailer 10 may be transported with ease and will not be effectively subjected to swaying or forces tending to overturn the same while moving on the road. The unique framework design enables a number of bunk members to be supported within the trailer without in any way providing an overcrowded condition, despite the fact that upper and lower bunks are employed. This two-level arrangement does not present any problem in erection or collapse of the illustrated trailer. Equipment such as sinks and stoves may be positioned in the trailer and so located as not to interfere with the raising or lowering of the roof. The various directions of pivotal movement disclosed in the drawing are given by way of illustration only and pivotal movement of the lifting arms may vary provided the slide and track assemblies are properly designed so not to abut against trailer wall portions.

Modifications of the illustrated apparatus are apparent. It may be possible, for instance, to dispense with clevis members 38 and 46 and pivot the lifting arms to the track. Also, one torsion bar may be adequate for lifting the arms and supported roof, and torsion bars in addition to those illustrated may be employed with the rear lifting arms 40.

It is intended that this invention be limited only by the scope of the appended claims.

We claim:
1. In a trailer construction a reciprocally movable roof, a collapsible support of pivotally movable lifting elements movable into elevated and lowered positions supporting said roof when in the elevated position, and at least one torque-storing means having one end portion fixedly anchored and an opposite end portion connected to and pivotally movable with one of said pivotally movable lifting elements whereby collapse of said support twists said torque-storing means and stores torque therein releasable when said collapsible support moves into said elevated position.

2. The trailer construction of claim 1 in which each of said torque-storing means is continuously in a twisted condition urging said lifting elements into the elevated position regardless of the position of said roof.

3. In a trailer construction, a trailer body and frame, a roof reciprocally movable relative to said trailer body, a collapsible support having pivotally movable elements disposed on each side of said trailer supporting said roof, stabilizer means spanning the interval between said trailer supports connected to corresponding pivotally movable elements of each of said collapsible supports enabling the same to operate simultaneously, and at least one torsion bar anchored at one end limit and supported by said trailer frame and secured to a pivotally movable element of one of said collapsible supports at an opposed end portion whereby collapse of said collapsible supports stores torque in said torsion bar tending to pivotally move the engaged portion of said framework in the direction of pivotal movement opposite to that effected during collapse.

4. In a trailer construction, a vehicle base, a wall and a wall framework supported on said base, a roof reciprocally movable in a vertical plane relative to said wall, collapsible lifting arms for reciprocally moving said roof, said lifting arms being arranged in pairs spaced about the interior of said trailer wall, each side of said trailer having two spaced pairs of arms transversely aligned with the two spaced pairs of the opposite side, each pair comprising an upper lifting arm pivotally connected at its lifting arm pivotally mounted on said wall framework at a lower end limit, said lifting arms of each pair being pivotally movable in opposite directions of pivotal movement into superposed alignment in the vertical plane, interconnecting means pivotally engaging the lower end limit of said upper lifting arm and the upper end limit of said lower lifting arm, track means fixedly engaging the interconnecting means of the two pairs of lifting elements disposed on each trailer side, resiliently biased slide means operatively mounted on each of said track means and longitudinally movable relative thereto, linking arms pivotally mounted on each of said slides and to an upper and lower lifting element of one pair of lifting elements on each trailer side, said linking arms enabling said upper lifting elements and said lower lifting elements to simultaneously pivot through identical angles of pivotal movement, and torsion bar means engaging at least one opposed pair of lower lifting elements continuously urging the same into a predetermined direction of pivotal movement.

5. In a trailer construction, a trailer body, a roof reciprocally movable between a lower position atop said trailer body and an elevated position spaced therefrom, collapsible lifting arms supporting said roof mounted on said body, said lifting arms being arranged in pairs comprising upper and lower arms pivotally movable in opposite directions of pivotal movement into the vertical plane, resiliently biased linking means connected to one upper and one lower lifting arm of one pair on each side of said trailer, said linking means enabling said upper lifting arm to effect pivotal movement corresponding with said lower lifting arm pivotal movement during movement of said collapsible lifting arms, at least one torsion bar fixedly anchored at one end limit and connected at an opposed end limit to one of said lower lifting arms and pivotally movable therewith whereby movement of said lower lifting arm away from the vertical plane results in twisting of said torsion bar, and rigid stabilizer means connecting opposed lower lifting arms engaged by said torsion bars enabling said opposed lifting arms to move simultaneously.

6. In a vehicle construction the combination comprising a body, a body frame, a roof reciprocally movable relative to said body between positions spaced from and atop said body, collapsible lifting arm assemblies supporting each side of said roof supported by said body frame, each assembly comprising two spaced lower pivotally mounted lifting arms, and two upper pivotally mounted lifting arms, connecting means pivotally engaging the upper end portions of each of said lower lifting arms and lower end portions of each of said upper lifting arms, track means interconnecting said connecting means disposed in a horizontal plane in the normal position of assembly, and spring biased toggle arms supported on said track means and pivotally engaging one upper and one lower lifting arm of each assembly forcing said upper lifting arm to pivotally move in a corresponding manner and in a reverse direction of pivotal movement relative to said lower lifting arm in the normal course of roof movement.

7. In a vehicle construction, a reciprocally movable roof, a supporting vehicle framework, transversely aligned, slotted pivot plates mounted on said framework, adjusting plates adjustably mountable on said pivot plates relative to said pivot plate slots, pivot means supported by said pivot plates, lifting arms supporting said roof mounted on said pivot means, and torsion bar means supported in a fixed position at one end portion on one of said transversely spaced pivot plates and secured at an opposite end portion to one of said lifting arms, the portion of said torsion bar means interposed the two end portions thereof being twisted whereby said lifting arm engaged thereby is continuously urged into one direction of pivotal movement.

8. In a vehicle construction, a vehicle body, opposed collapsible supports comprising spaced pairs of upper and lower lifting arms, a reciprocally movable vehicle member supported by said upper lifting arms, said lower lifting arms being supported by said vehicle body and pivotally movable through an angle in one direction of rotation between the vertical and a position at an acute angle relative to the horizontal in planes parallel to the sides of said vehicle body, said upper lifting arms being movable through an angle in a direction of pivotal movement opposite to that of said lower lifting arms between the vertical and a position at an acute angle relative to the horizontal in planes parallel to the sides of said vehicle body, interconnecting means engaging a lower end portion of an upper lifting arm and an upper end portion of a lower lifting arm of each of said pairs, horizontal means for engaging and maintaining said interconnecting means disposed on each side of said vehicle body in fixed spaced relationship, reciprocally movable slide means operatively mounted on each of said horizontal means and longitudinally movable relative thereto, toggle means pivotally mounted on said slide means for forcing the upper lifting arm of one of said lifting arm pairs to synchronously move with the lower lifting arm of said one pair in opposite directions of pivotal movement, and means anchored at one end limit connected at an opposite end limit to said slide means resiliently urging said slide means in a direction of movement relative to said horizontal means tending to urge said lower and upper lifting arm to which connected into vertical alignment.

9. The vehicle construction of claim 8 in which stop means are supported by said vehicle body and disposed in the path of said pivotally moving lower lifting arms for engaging said pivotally movable lower lifting arms when said lower lifting arms are in a vertical position thereby preventing further pivotal movement thereof.

10. The vehicle construction of claim 8 in which said interconnecting means have upwardly projecting stop portions for preventing further pivotal movement of said upper lifting arms when said arms are arranged at 90° to the horizontal as a result of urging of said toggle means.

11. In a vehicle, opposed collapsible frame assemblies, a reciprocally movable vehicle member supported by said frame assemblies, each frame assembly comprising two spaced pairs of superposed lifting arms in spaced end-to-end relationship, clevis means comprising spaced flanges joined by an interconnecting bight portion having the adjacent ends of said superposed lifting arms pivotally mounted between opposed end flange portions of said clevis, the upper and lower lifting arms of each pair being pivotally movable in opposite directions through acute angles between the vertical and a position disposed at an acute angle thereto, track means interconnecting the two clevis means of each assembly, slide means movable in said track means resiliently urged toward one end of said track means, and linking arms mounted on said slide means angularly disposed to and engaging the lifting arms of one lifting arm pair adjacent their pivotal engagements with one of said clevis means, pivotal movement of the lower lifting arm of said one pair away from the vertical forcing said upper lifting arm of said one pair to move away from the vertical by means of said slide and linking arm connections, said upper and lower lifting arms being substantially equal in length and simultaneously moving through the same angles in reverse directions in the course of pivotal movement whereby said reciprocally movable vehicle member moves in a single vertical plane.

12. In a vehicle construction, opposed pivotally mounted, collapsible lifting arms, a reciprocally movable roof supported by said arms, said arms being arranged on each side of said vehicle in spaced pairs of vertically aligned upper and lower lifting arms in end-to-end relation when said roof is in the upper position of its reciprocal movement, said upper and lower lifting arms being of substantially the same length, means engaging at least some of said upper and lower lifting arms for enabling the upper lifting arms to pivot in an opposite direction of pivotal movement from said lower lifting arms but through the same angles when said lower arms are pivotally moved, and torsion bar means anchored at one limit and connected to at least one of said lower lifting arms at an opposed end limit whereby pivotal movement of said lower lifting arms caused by lowering of the roof twists said torsion bar means storing torque therein available for reverse pivotal movement of said lower lifting arms.

References Cited in the file of this patent
UNITED STATES PATENTS

| | | |
|---|---|---|
| 2,182,967 | Kors | Dec. 12, 1939 |
| 2,518,278 | Brumbaugh | Aug. 8, 1950 |
| 2,729,497 | Runyan | Jan. 3, 1956 |
| 2,798,760 | Hille | July 9, 1957 |
| 2,976,912 | Dias | Mar. 28, 1961 |

UNITED STATES PATENT OFFICE

CERTIFICATE OF CORRECTION

Patent No. 3,048,438 August 7, 1962

Fred C. Koch et al.

It is hereby certified that error appears in the above numbered patent requiring correction and that the said Letters Patent should read as corrected below.

Column 8, line 41, after "its" insert -- upper distal end limit to said roof and a lower --.

Signed and sealed this 13th day of November 1962.

SEAL)
ttest:

RNEST W. SWIDER
:testing Officer

DAVID L. LADD
Commissioner of Patents